United States Patent [19]

Alfenaar

[11] 4,091,176
[45] May 23, 1978

[54] POROUS ELECTRODE

[75] Inventor: Marinus Alfenaar, Schinnen, Netherlands

[73] Assignee: Stamicarbon, B.V., Geleen, Netherlands

[21] Appl. No.: 665,447

[22] Filed: Mar. 9, 1976

[30] Foreign Application Priority Data

Mar. 11, 1975 Netherlands .................... 7502842

[51] Int. Cl.² ............... H01M 4/62; H01M 4/64; H01M 4/86
[52] U.S. Cl. ............................ 429/40; 429/235; 429/42; 252/425.3
[58] Field of Search ............ 429/40, 42, 39, 235; 204/290 R

[56] References Cited

U.S. PATENT DOCUMENTS

| 3,423,243 | 1/1969 | Kordesch et al. | 429/40 |
| 3,423,247 | 1/1969 | Darland et al. | 429/40 |
| 3,481,787 | 12/1969 | Adlhart | 429/40 |
| 3,554,809 | 1/1971 | Craft | 429/39 |
| 3,835,514 | 9/1974 | Pollack | 429/235 |
| 3,854,994 | 12/1974 | Binder et al. | 429/40 |
| 4,001,039 | 1/1977 | Elmore et al. | 429/40 |

Primary Examiner—Howard S. Williams
Assistant Examiner—H. A. Feeley
Attorney, Agent, or Firm—Cushman, Darby & Cushman

[57] ABSTRACT

An improved porous electrode comprised of a porous, electrically conductive layer and an electrically conductive grid in which the normally high internal resistance of the electrode is substantially reduced by the presence of electrically conductive fibers in contact with the porous layer.

23 Claims, 2 Drawing Figures

POROUS ELECTRODE

BACKGROUND OF THE INVENTION

The present invention relates to a porous electrode, which electrode contains a porous, electrically conductive layer and an electrically conductive grid which serves as collector.

Electrodes of this type can be applied especially in fuel cells. During operation, the fuel employed will penetrate into the pores of the porous layer, which, as a rule, contain a catalytically active material for catalizing the galvanic combustion of the fuel. Generation of electric current takes place throughout the porous layer and the current generated is absorbed by the electrically conductive grid and carried off. The electrode is in contact with a suitable electrolyte which closes the current circuit within the fuel cell and with which also the reaction products of the electrode reactions occuring at the cathode and the anode can be discharged.

A considerable drawback of presently known porous fuel-cell electrodes is their high internal resistance, which has an unfavorable influence on the efficiency of current generation. In principle, internal resistance of the electrode might be reduced by decreasing the mesh width of the collector gauze. Such an approach will not effectively solve the problem, however, since the accessibility of the electrode surface and/or the pore walls becomes insufficiently large resulting in additional problems. In practice, collector gauze is applied having a wire thickness of about 300 μm and a mesh width of 700 μm or a corresponding perforated metal plate.

The present invention describes a porous electrode for a fuel cell wherein good accessibility of the catalytically active material is retained but where the internal resistance of the electrode is substantially reduced. According to the invention, a porous electrode which electrode contains a porous, electrically conductive layer and an electrically conductive grid which serves as collector, is characterized in that on or in the porous layer there are very thin fibres of an electrically conductive material.

Thus, it is an object of the present invention to provide a more highly efficient porous electrode.

Another object is to provide a porous electrode having a substantially reduced internal resistance without detrimentally affecting the porosity of the electrode.

Various other and more detailed objects and advantages of the invention, such as arise in connection with carrying out the above-noted ideas in a practical embodiment will become more readily apparent and will, at least in part, be hereinafter stated as the specific detailed description of the invention proceeds.

For a full and more complete understanding of the invention, reference may be had to the following description and the following drawings wherein.

Figure 1:
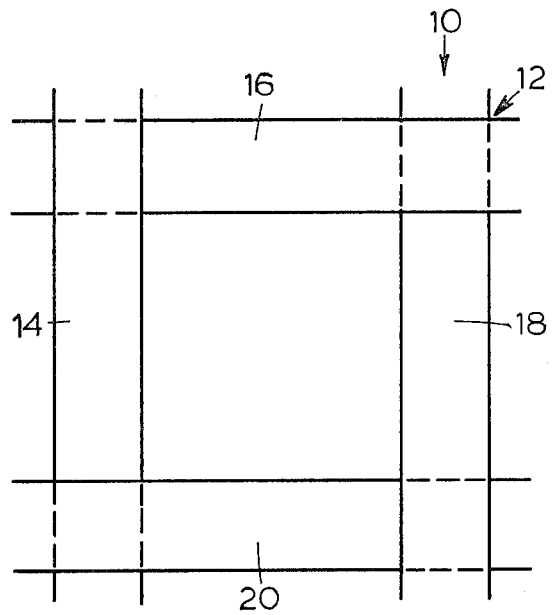
FIG. 1 is a plan view diagrammatically depicting a gas-diffusion electrode.

Referring now to the drawings, wherein like reference numerals denote indentical corresponding parts, a gas-diffusion electrode is generally indicated at 10. The collector gauze, of which only a portion is shown, is generally indicated at 12 and is comprised of nickel wires 14, 16, 18 and 20. However, it should be understood, that a perforated nickel plate, sometimes referred to as expanded metal or other comparable devices could also be used instead of a wire gauze. The thickness of nickel wires can vary but will normally be in the range of from 150 to 350 μm preferably about 300 μm, throughout this description, porosity is understood to be the ratio between the volume occupied by the pores (or the volume not occupied by the material in question) and the total volume of the relevant layer. The porosity of the collector gauze is normally between 40 and 75%, preferably about 50%.

Figure 2:
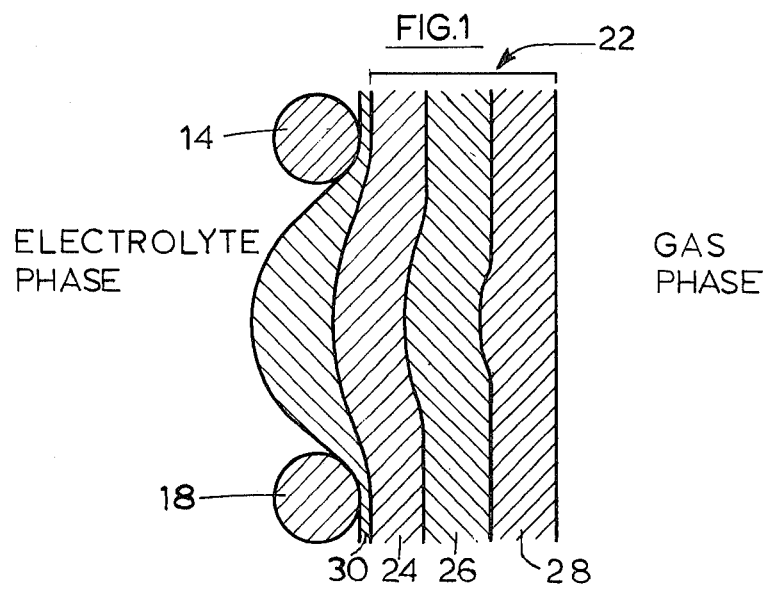
FIG. 2 is a cross-sectional view normal to the electrode surface.

The wires are embedded in a porous layer, generally indicated at 22, which is made up of the constituent layers 24, 26 and 28. The thickness of the layers is preferably in the range of from 10 to 300 μm. When the electrode is in operation, the electrolyte phase is on one side of porous layer 22, as indicated in FIG. 2 and some electrolyte has then penetrated into the pores of the electrode. The gas phase is on the other side of porous layer 22 during operation of the electrode. For example, a gas mixture containing molecular oxygen such as air could be applied.

Layer 24 consists of a mixture of carbon and polytetrafluorethylene with the amount of carbon preferably ranging between 92% and 85% by weight of carbon and the amount of polytetrafluorethylene ranging between 8% to 15% by weight of polytetrafluorethylene. Preferably, the mixture for layer 24 will be about 90% by weight of carbon and about 10% by weight of polytetrafluorethylene. Layer 24 is approximately 40 μm thick, but, of course, is less thick in the neighborhood of the collector wires 14 and 18, as shown in FIG. 2. Layer 24 may contain catalytically active material, as described hereinafter, but this is not essential. The porosity of layer 24 — apart from the micro-pores in the carbon particles, which pores are not of interest as far as the action of the electrode is concerned, preferably is about 30%. By preference, however, the porosity will vary between 25% and 35%. The pore width will generally vary between 1 μm and 10 μm. This porosity depends on the particle size of the polytetrafluorethylene powder with which the layer is made and on the pressure applied during the manufacture of the electrode. The same applies to the porosities of the layers 26 and 28 to be described hereinafter.

Layer 26 has a thickness of about 80 μm and is also comprised of a mixture of carbon and polytetrafluorethylene and additionally contains 0.86 mg/cm$^2$ of silver as a catalytically active material. Preferably, the polytetrafluorethylene content lies between 15% and 30% by weight while the carbon content varies between 85% and 70%. Preferably, the mixture for layer 26 will be about 79% by weight of carbon and about 21% by weight of polytetrafluorethylene. The porosity of layer 26 preferably will be from about 20% to about 25%, preferably about 20%.

Layer 28 has an average thickness of 180 μm and is comprised of polytetrafluorethylene. The average porosity of layer 28 is preferably in the range of from about 40% to about 75%, preferably about 50%, and the pore width can vary as in the case of the layers 24 and 26, between 1 μm and 10 μm.

An electrode as described hereinabove can be used in an electrochemical semi-cell and the polarization curve is determined at 80° C in a 30% by weight potassium hydroxide solution according to the method described by F. von Sturm, 'Elektrochemische Stromerzeugung', Verlag Chemie, Weinheim/Bergstr., 1969, pages 71 and 72.

Layer 30 has preferably a thickness in the range of from about 10 to 50 μm and is comprised, for example, of silver fibres having a circular cross-sectional shape with a diameter of 5 μm and a length preferably of at least 1 mm, more preferably varying between about 3 mm to about 8 mm. Layer 30 is also porous and the porosity of layer 30 amounts to about 95%, preferably at least about 80%.

The specific internal resistance of an electrode wherein layers 24 and 26 contain the preferred amounts of carbon and polytetrafluoroethylene was found to amount to 0.2 Ohm.

Where an identical electrode was constructed having layers 24, 26, and 28, omitting only the conductive layer 30, the internal resistance was found to be no lower than 0.7 Ohm.

The quantity of metal fibre necessary to achieve a substantial decrease of the internal resistance of the electrode is very small. Hence, the fibres have no perceptible detrimental influence on the porosity properties of the electrode. Nor is the action of the electrode otherwise affected unfavorably in any respect.

Preference is given to the fibres having been laid in random patterns or in disarranged relative positions. Realization of such structures is quite simple, for instance by strewing the fibres on the porous layer. A single layer of fibres may occur in the electrode, but also more layers of fibres may have been stacked on one another.

As indicated previously, the electrode described herein is characterizied by the presence of very thin conductive fibres located on or within the porous portion of the electrode structure.

Reference to 'fibres' herein should be understood to mean particles having a large length/thickness ratio, for instance a length/thickness ratio of at least 100, preferably at least 500. The fibres to be used are many times thinner than the customary collector gauze and have a thickness which is preferably not greater than 20 μm. By preference, metal fibres are used, but fibres from other materials exhibiting good electric conductivity, like carbon, can also be used. The fibres may be circular in section, but may also include other cross-sectional shapes or may even be flattened.

Preference is given to fibres consisting of a metal which has a high specific conductivity and is inert under the operating conditions of the fuel cell in which the electrode is to be used. Examples would include platinum, gold, iridium, silver, nickel or alloys of two or more of these metals. Also alloy steels such as chromium-nickel steel and the like are applicable. For electrodes to be used with an alkaline electrolyte particularly nickel and silver are to be considered; if an acid electrolyte is applied, the noble metals are to be preferred.

It should be understood that electrodes according to the present invention, can be made by many suitable methods. One such method could be as follows.

Catalytically active material, preferably in powdered form, can be mixed with a carrier material and/or a binding agent, both in powdered form, and possibly also with a pore-forming agent. The mixture can be compressed, as for example, in a suitable mold, and suitably treated to an elevated temperature thereby transforming the mixture into an electrode of a predetermined shape. Thereafter, the pore-forming material may be removed, as for example, by soaking or treating with hot water.

The carrier material for the catalytically active material could be one of many particularly electrically conductive materials, such as for example carbon. The carbon particles may be cemented together with the aid of a suitable binding agent which, for instance, can include polymeric materials such as polyethylene, polytetrafluorethylene or polyvinylchloride. Effective pore-forming agents can include soluble salts such as sodium sulphate, sodium carbonate, ammonium carbonate, however, other water soluble salts can be used, generally including alkali-metal salts, ammonium salts and soluble salts of metals of the pomp IIA and IIIA of the Periodic System of Elements such as calcium chloride and aluminum sulphate.

Where fuel-cell electrodes are to be used as an anode, the powdery catalytic material may well be a commercially available platinum black or palladium black or a mixture thereof, or other suitable materials like nickel. In fuel-cell electrodes which are to be used as a cathode, the catalytically active material is preferably powdered silver. However, the invention is not limited to specific catalytic materials, which may even be entirely absent, or to specific modes of preparing the porous layer. The porous layer may also consist of a catalytically active material which is dispersed in a finely divided form in a porous matrix of carrier material and/or binding agent. The catalytically active material may also be non-powdery, but porous-coherent. The porous layer may then also be obtained by sintering through conventional processes employing a powder of the relevant catalytically active material, usually a metal.

The porosity of the porous layer may be equal over the entire thickness of the porous layer, but may also increase or decrease in a direction of thickness. Too, the porous layer may consist of two or more layers in which the porosity is the same in each of the constituent layers over the entire thickness, but the porosity in the various constituent layers differs.

The invention can be applied both for electrodes which are in contact with a liquid phase on either side during operation and for gas-diffusion electrodes. In the case of gas-diffusion electrodes, by preference a layer sealing against liquid but permeable to gas connects with the catalsyt-containing layer which is sufficiently porous to transmit gas and liquid. This sealing layer may e.g. consist of a polymeric material such as polyethylene, polypropylene, polytetrafluoroethylene or polyvinylchloride.

During operation, the gas and liquid-permeable layer is then in contact with the electrolyte, for instance a sodium hydroxide or potassium hydroxide solution or a phosphoric acid solution, while the layer which is only permeable to gas being in contact with the gas. At the anode, the gas is the gaseous fuel, such as for instance, hydrogen. At the cathode, the gas is oxygen or a gas containing molecular oxygen, for instance air.

The most practical procedure is first to prepare the porous layer and subsequently to prepare one or more layers of the fibres to be applied according to the invention, as a rule metal fibres, in contact with the porous layer. Finally, the coarse collector gauze is placed on the fibre-layer side, and pressed at least partly into the layer system previously constructed. A very solid electrode with good porosity properties is then obtained. If necessary, the fibres may also be formed within the porous layer during the preparation thereof, so that, in the finished electrode, the fibres are not present on, but in the porous layer.

It will now be clear that there is provided a device which accomplishes the objectives heretofore set forth. While the ivention has been disclosed in its preferred form, it is to be understood that the specific preferred embodiment thereof, as described and illustrated hereinabove, is not to be considered in a limited sense as there may be other forms or modifications of the present invention which should also be construed as coming within the scope of the appended claims.

What is claimed is:

1. A porous electrode comprising a porous electrically conductive structure including a plurality of layers, said plurality of layers including a first layer which when said electrode is in operation is in contact with the electrolyte, said first layer being a conductive layer having a porosity of at least 80 percent and comprised of metallic fibers, a second layer attached to said first layer exteriorly thereof comprised of a mixture of carbon and polytetrafluoroethylene, a third layer attached to and exteriorly of said second layer comprised of carbon and polytetrafluoroethylene together with a catalytically active material, and fourth layer attached to and exteriorly of said third layer and having an exterior side which when said electrode is in operation is opposite the electrolyte side, said fourth layer being comprised of polytetrafluoroethylene and a collector structure pressed into said plurality of layers on the electrolyte side thereof so that it extends along the surface of said first layer in contact with the electrolyte, said collector structure including metallic wires having a thickness ranging between about 150μm to about 350μm and a porosity ranging from about 40 percent to about 75 percent.

2. A porous electrode as claimed in claim 1, wherein said fibres are metal fibres.

3. A porous electrode as claimed in claim 2, wherein said metal fibres are nickel fibres.

4. A porous electrode as claimed in claim 2, wherein the metal fibres are silver fibres.

5. A porous electrode as claimed in claim 2, wherein the metal fibres are noble metal fibres.

6. A porous electrode as claimed in claim 1, wherein the thickness of the fibres amounts to at most 20 μm.

7. A porous electrode as claimed in claim 1, wherein the fibre length to thickness ratio varies between about 100 to about 500.

8. An electrochemical cell containing one or more porous electrodes of claim 1.

9. A porous electrode as in claim 1 wherein said fibers have a circular cross section with a diameter of about 5μm and a length of at least 1mm.

10. A porous electrode as in claim 1 wherein said second layer has a thickness ranging between about 10 to about 50μm.

11. A porous electrode as in claim 1 wherein the carbon content of said second layer ranges from about 85 to about 92 percent by weight of carbon and the polytetrafluoroethylene content of said second layer ranges from about 15 to about 8 percent by weight of polytetrafluoroethylene.

12. A porous electrode as in claim 1 wherein the carbon content of said third layer ranges from about 70 to about 85 percent by weight of carbon and the polytetrafluoroethylene content of said third layer ranges from about 30 to about 15 percent by weight of polytetrafluoroethylene.

13. An electrode as in claim 1 wherein said second layer further includes a catalytically active material.

14. A porous electrode comprising a porous multilayer structure including a first porous electrically conductive layer having first and second faces, said first face comprising the outer, non-active side of the electrode, a plurality of electrically conductive fibers laid on the second face of said first layer so that said fibers form at least a second layer on said second face having a porosity of at least 80 percent, said second layer being in contact with the electrolyte, a collector structure pressed into said multilayer structure on the electrolyte side thereof so that it extends along the outer surface of said second layer, said collector structure including metallic wires having a thickness ranging between about 150μm to about 350μm and a porosity ranging from about 40 percent to about 75 percent.

15. A porous electrode as in claim 14 wherein said fibers have a circular cross section with a diameter of about 5μm and a length of at least 1mm.

16. A porous electrode as in claim 14 wherein said second layer has a thickness ranging between about 10 to 50μm.

17. A porous electrode as in claim 14 wherein said fibers are laid randomly on said second surface of said first porous layer.

18. A process for preparing a porous electrode having a reduced internal resistance and an electrically conductive collector located at the electrolyte side thereof comprising the steps of preparing a porous electrically conductive layer, forming at least one layer of fibers of an electrically conductive material on the side of said porous layer closest to the electrolyte so that the fiber layer exhibits a porosity of at least 80 percent, placing a collector structure comprised of wires having a thickness ranging between about 150μm to about 350μm and a porosity ranging from about 40 percent to about 75 percent against the fiber layer and pressing the collector structure at least partly into the porous layer structure.

19. The process as set forth in claim 18 wherein the step of preparing the porous electrically conductive layer includes the additional steps of preparing a first porous layer having a porosity ranging between about 25 percent to about 35 percent comprised of a mixture of carbon and polytetrafluoroethylene, preparing a second porous layer having a porosity ranging between about 20 percent to about 25 percent comprised of a mixture of carbon, polytetrafluoroethylene and catalytically active material, preparing a third porous layer having a porosity ranging between about 40 percent to about 75 percent comprised of polytetrafluoroethylene and subsequently bonding the first, second and third layers together so as to form the porous electrically conductive layer.

20. A process as set forth in claim 19 wherein the amount of carbon within the mixture comprising said first porous layer ranges between 92% to 85% by weight of carbon and the amount of polytetrafluoroethylene in said first porous layer ranges between 8% to 15% by weight of polytetrafluoroethylene and the amount of carbon in the mixture comprising said second porous layer ranges between 85% to 70% by weight of carbon and the amount of polytetrafluoroethylene in said second porous layer ranges between 15% to 30% by weight of polytetrafluoroethylene.

21. The process as set forth in claim 18 wherein the catalytically active material contained within the mixture comprising said second porous layer is silver.

22. The process as set forth in claim 20 wherein the preferred mixture for said first porous layer is about 90% by weight of carbon and about 10% by weight of polytetrafluoroethylene and the preferred mixture for said second porous layer is about 79% by weight of carbon and about 21% by weight of polytetrafluoroethylene.

23. The process as set forth in claim 19 wherein the fibers used in preparing said at least one layer of fibers have a diameter of about 5 microns and a fiber length of at least 1 millimeter.

* * * * *